United States Patent

[11] 3,599,497

[72] Inventor Akira Fukumitsu
Kawasaki, Japan
[21] Appl. No. 35,079
[22] Filed May 6, 1970
[45] Patented Aug. 17, 1971
[73] Assignee Tokyo Shibaura Electric Co., Ltd.
Kawasaki, Japan
[32] Priority May 7, 1969
[33] Japan
[31] 34515/69

[54] CHANNEL SELECTING DEVICES
9 Claims, 8 Drawing Figs.

[52] U.S. Cl. .......... 74/10.41, 74/10.45, 74/10.52
[51] Int. Cl. .......... F16h 35/18
[50] Field of Search .......... 74/10.15, 10.41, 10.45, 10.5, 10.8, 10 R, 10.52

[56] References Cited
UNITED STATES PATENTS

| | | | |
|---|---|---|---|
| 2,604,791 | 7/1952 | Daly | 74/10.41 |
| 3,224,282 | 12/1965 | Tyzack | 74/10.15 |
| 3,270,571 | 9/1966 | Leedom | 74/10.41 |

*Primary Examiner*—Milton Kaufman
*Attorney*—Flynn and Frishauf

ABSTRACT: A channel-selecting device comprises a channel selector shaft, a support mounted on the channel selector shaft, a plurality of individually adjustable tuning elements mounted on the support concentrically with the selector shaft, a stop mechanism to arrest one of the elements, indicators connected to the elements, a channel dial connected to said channel selector shaft, a preset and fine-tuning mechanism to rotate said support while said channel-selecting elements are being arrested by said stop mechanism in order to preset said arrested elements to the desired channels and a tuner interlocked with the channel selector shaft.

CHANNEL SELECTING DEVICES

BACKGROUND OF THE INVENTION

This invention relates to a channel-selecting device and more particularly to an improved multichannel tuner suitable for use in television-receiving sets.

With a general trend of wide spread use of television broadcasting in the U.H.F. band it has been developed various types of U.H.F. channel-selecting devices for television receivers. However, many of the prior art frequency selectors are not only complicated in construction and expensive but are difficult to manipulate.

Thus for example, according to one prior design of the channel selector mechanism, instead of moving stepwisely the channel selector shaft of a U.H.F. tuner to respective channels the shaft is moved continuously, a control shaft is interlocked with the channel selector shaft through an endless cord passing therearound and a pointer is secured to the cord thus enabling the operator to select the desired channel.

With this construction, however, as the selecting operation is performed continuously, preset and fine tuning are very difficult. Further, while channel selection is relatively easy when the speed reduction ratio between the tuner shaft and the control shaft is made large it is necessary to rotate many turns the control shaft when it is desired to change from one channel to the other. Conversely with a small speed reduction ratio fine channel selection becomes difficult.

To solve these difficulties another type of channel-selecting device has been proposed wherein a stepping-type channel selector mechanism is associated with the channel selector shaft of the U.H.F. tuner to stepwisely move the control shaft to respective channels in the same manner as the conventional V.H.F. tuner. However, different from the V.H.F. broadcasting system usually covering relatively small number of channels, say, 12 channels, a U.H.F. broadcasting system covers much number of channels, for example 52 channels. Consequently, the channel selector mechanism becomes complicated and expensive so that it is not suitable for mass production. Although as many as 52 channels are assigned for a U.H.F. broadcasting system the number of U.H.F. channels receivable in a particular area is limited to a relatively small number, for example 5 to 6 particular channels. However, when assembling television-receiving sets it is necessary to have precise preset tuning for all channels, thus requiring troublesome and time consuming adjustment. Incorporation of a fine-tuning mechanism results in more complicated construction and adjustment. Further, when changing from one U.H.F. channel to the other, the user is required to step the channel selector shaft over a number of idle channel positions. Such a construction not only requires a considerable operating power but also is liable to be damaged.

SUMMARY OF THE INVENTION

Accordingly, it is the principal object of this invention to provide an improved channel-selecting device having a simple construction and easy to manipulate.

A further object of this invention is to provide a novel channel selector capable of readily presetting desired channels.

Another object of this invention is to provide a novel channel selector capable or readily providing fine tunings for desired channels.

Briefly stated, in accordance with a preferred embodiment of this invention there is provided a channel-selecting device comprising a chassis, a channel selector shaft mounted on the chasses to be rotatable continuously to various channel positions, a support mounted on the selector shaft to rotate therewith, a plurality of individually adjustable channel-selecting elements mounted on the support concentrically with the selector shaft, each one of said elements corresponding to each presettable channel, a supporting mechanism supporting the channel-selecting elements so as to permit them to rotate relative to the support and to arrest the elements in preset positions, a stop mechanism positioned at a predetermined position to successively engage the elements carried by the support, said stop mechanism arresting said elements with a force sufficient to be manually disengaged from the stop mechanism, indicators connected to the channel-selecting elements to move therewith, a mechanism to rotate the support while the channel-selecting elements are being arrested by the stop mechanism to preset the arrested elements to the desired channels and a tuner having a shaft operatively connected with the channel selector shaft.

DESCRIPTION OF THE PREFERRED EMBODIMENTS

Figure 1:
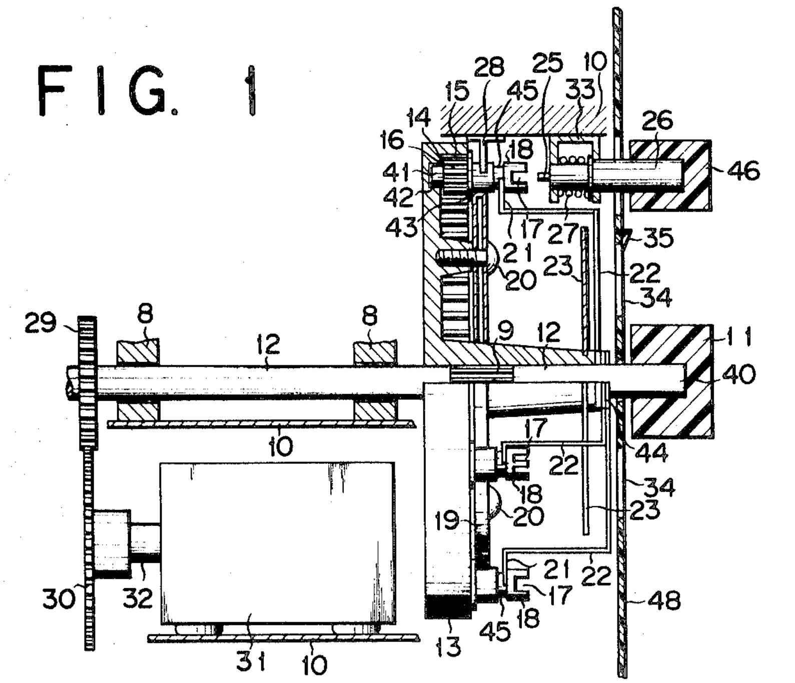
FIG. 1 shows a side elevation, partly in section, of one example of a channel-selecting device embodying this invention.
Figure 3:
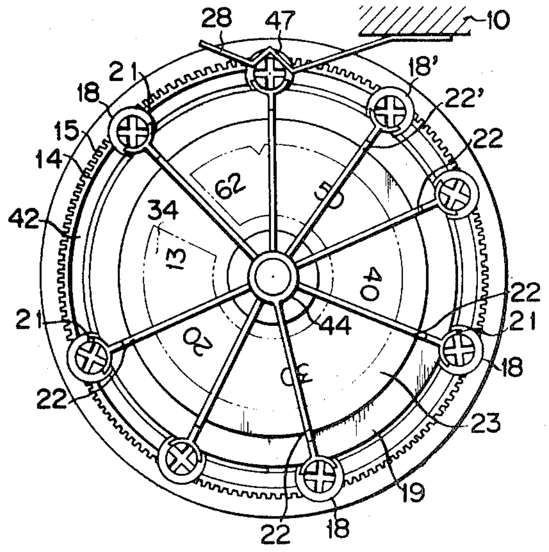
FIG. 3 is a front view of the dial of the device shown in FIG. 1.
Figure 2:
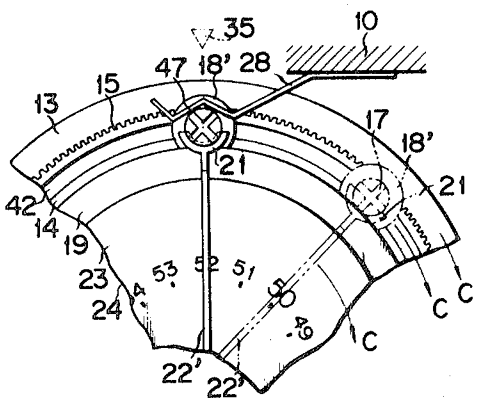
FIG. 2 is an enlarged view of a dial plate to explain the operation of the device shown in FIG. 1.

With reference now to FIGS. 1, 2 and 3 of the accompanying drawings there is shown one embodiment of this invention comprising a chassis 10 rotatably carrying a channel selector shaft 12 journaled by a pair of bearings 8 secured to the chassis 10. To manually rotate the shaft 12 a knob 11 is secured to one end 40 of shaft 12. A circular support or a rotor 13 is mounted on a knurled portion 9 at about the center of shaft 12. An annular recess 14 concentric with shaft 12 is formed on one side of the rotor 13, and an internal gear 15 is formed on the outer peripheral wall of the recess. A plurality of, for example 8 channel selecting elements 18 each including a pinion 16 meshing the internal gear 15 are disposed on a circle concentric with shaft 12. The inner end 41 of each channel-selecting element 18 is received in an annular slot 42 at the bottom of the recess. To movably position channel-selecting elements 18 along the slot 42 there is provided a supporting mechanism including flanges 43 which are urged toward the internal gear 15 by means of a resilient friction disc 19. To ensure positive urging, each element 18 is provided with the flange 43 in engagement with the friction disc which is secured to rotor 13 by means of rivets 20. The outer end of each channel-selecting element 18 is provided with a recess 17 of a crisscross configuration. An indicating pointer 22 is provided for each channel-selecting element 18. The pointer has generally a letter L configuration and an annular ring 44 formed at one end thereof is rotatably fit on the shaft 12. The other end of the pointer is bent at right angles to form an arcuate support received in a slot 45 of each element 18. Thus, the indicator 22 is rigidly secured to each associated channel selecting element 18 so that when the element 18 is rotated about shaft 12 indicator 22 is moved with the associated element 18. Although in FIG. 3, there are shown eight elements 18 and eight indicators 22, in FIG. 1, for the sake of simplicity, only three elements 18 and indicators 22 are shown. A dial disc 23 is secured to rotor 13 closely adjacent indicators 22. A plurality of scale and channel indicating numerals for up to 52 channels for which the U.H.F. tuner can be tuned as described later are provided on the surface of the dial disc 23. A preset and fine-tuning shaft 26 is disposed to oppose the crisscross recess 17 of each channel-selecting element 18. A blade 25 is provided on the inner end of respective shaft 26 which is adapted to fit in the recess 17 of the element 18 to drive it. The tuning shaft 26 is slidably mounted on a channel member 33 of the chassis 10 and is normally biased toward right, as viewed in FIG. 1, by means of a compressed spring 27 to disengage from the channel-selecting element 18. When a knob 46 is pushed inwardly while being rotated, the blade 25 will be received in the recess 17 of the element 18 to rotate the same. Further, a stop mechanism is provided so as to successively engage channel-selecting elements 18 rotated with the rotor 13. In other words, one of the elements 18 is arrested at this position to perform preset and fine tuning of a desired channel by rotating the associated shaft 26. For this reason, this position may be termed as the preset and fine-tuning position. As the stop mechanism may be employed any suitable mechanism such as a detent formed in a resilient metal sheet. In the illustrated example, this is shown as a click stop segment 28 of a resilient metal sheet. More particularly, a detent 47 is formed near one end of the click stop segment 28 to engage and arrest one of the channel-selecting elements 18, the other end of the segment 28 being secured to the chassis 10. Of course, the arresting force is not so strong so that the element 8 can be readily disengaged from the detent 47 by manual operation.

The channel selector shaft 12 is coupled to a U.H.F. tuner 31 supported on the chassis 10 through a motion transmission mechanism comprising a pinion 29 secured to shaft 12 and a gear 30 secured to channel selector shaft 32, the gear ratio between pinion 29 and gear 30 being selected to be 1:2. The U.H.F. tuner 31 may have a well-known construction and is contained in a rectangular metal casing. The selector shaft is constructed to rotate continuously for channel selection instead of being rotated stepwisely. Description regarding the detail of the U.H.F. tuner 31 is believed unnecessary because it is well known in the art and is immaterial to this invention.

An arcuate perforation 34 is formed through the front plate 48 to view the dial disc 23. In this embodiment, although eight indicating pointers 22 and eight elements 18 are shown, the number of these component parts may be lesser than eight. In other words, the number of these component parts may be equal to the number of U.H.F. channels which can be received in a given area. As above described the number of U.H.F. channels receivable in an area in which commercial television receivers can be used is at most five so that provision for eight channels as in this example is sufficient.

It is to be understood that positions of the channels tunable with the U.H.F. tuner are adjusted to correspond to relative angular positions of the channel selector shaft 12. Such an adjustment is made by utilizing as the reference said predetermining position confronting the click stop segment 28. Indicating projections 35 are formed on the front plate 48 to enable easy viewing of the predetermined positions. Upon rotation of the channel selector shaft 12 by means of knob 11, the channel selection operation of the U.H.F. tuner 31 is effected through the motion transmission mechanism 29 and 30. Numerals designating the channels which are tuned at the predetermined positions are marked on the dial disc 23. Thus by aligning a particular channel numeral on the dial disc with a predetermined position or a corresponding indicating projection 35 by the rotation of shaft 12 the U.H.F. tuner 31 can be adjusted to select a particular channel corresponding to said channel numeral.

The channel-selecting device constructed as above described operates in the following manner. Thus, when knob 11 is rotated to rotate the selector shaft 12, rotor 13, channel-selecting element 18, indicator 22 and dial disc 23 are rotated therewith. Concurrently therewith, shaft 23 of U.H.F. tuner 31 is also rotated to select a desired channel. It is to be noted that the channel selector shaft 12 can be rotated smoothly and continuously until a preset and fine-tuning position is reached, or one of the successively moved elements 18 comes to engage the click stop segment 28. Each time the element 18 engages the click stop segment 28, the element will be arrested but as the shaft 12 is rotated further the element can be readily disengaged from the click stop segment 28, such engagement and disengagement being assured by the cooperation of detent 47 of the element 28 and groove 45 of element 18.

Operation of the selector to preset a desired channel in a given area will be described. First, knob 11 is rotated to align the numeral of the desired channel marked on the dial disc with the projection or index 35 whereby the shaft 12 is rotated until an indicator 22 closest to the desired channel numeral is just aligned with the index 35. At this time the slot 45 of the element 18 engaging the indicator 22 will be received by the detent 47. Then the user's hand feels that the rotation of the element 18 is arrested by the detent. Under these conditions, when the preset fine-tuning shaft 26 is moved by knob 46 to the left, as viewed in FIG. 1, the blade 25 will be received in the crisscross recess 17 of the element 18 which has been brought immediately beneath the shaft 26 thus causing to rotate this element 18 alone. Of course, other elements 18 can not rotate. The element 18 is clamped between the detent 47 and the friction disc 19, urged downwardly by the disc 19 and its inner end 41 received in the groove 42 so that the element 18 is maintained at the adjusted position together with the indicator 22. Accordingly, as the element 18 is rotated about its own axis rotor 13 is rotated by the meshing of pinion 16 and internal gear 15 of the rotor 13. The rotor 13 is rotated by knob 46 until a scale corresponding to the desired channel numeral coincides with the associated indicator 22 or index 35. Remaining elements 18 and indicators 22 rotate with the rotor 13. As the rotor 13 rotates, shaft 12 is also rotated to tune the U.H.F. tuner 31 to the channel corresponding to the indicator 22 through pinion 29 and gear 30. Thus the preset operation of the desired channel will be completed when the indicator 22 is aligned with corresponding channel digit scale, and the particular channel selecting element 18 associated with the indicator 22 is also preset to the channel. During this preset operation since rotor 13 rotates over a small angle for one complete rotation of the channel-selecting element 18, fine tuning is also possible. In this manner, both presetting and fine tuning can be provided by the operation of shaft 26.

In order to have better understanding, a preset operation to 52nd channel will be described with reference to FIGS. 2 and 3. Assume now that at first the tuner is in the condition shown in FIG. 3. First, knob 11 is rotated until an element 18′ of an indicator 22′ closest to the scale of the 52nd channel (initially positioned at the 50th channel, in FIG. 3) comes to engage stop segment 28 by utilizing index 35 as the reference. Then the knob 46 is pushed and rotated in the clockwise direction to rotate rotor 13 in the direction indicated by arrows *c* in FIG. 2. The rotation of knob 46 is terminated when the scale of the 52nd channel comes to the position just below indicator 22′. In this manner, element 18′ will be preset to the 52nd channel.

Other elements and indicators 22 are preset to the desired channels in the same manner. FIG. 3 shows a condition wherein 18th, 22nd, 30th, 39th, 45th, 50th and 55th channels are preset. It is now assumed that seven channels of a U.H.F. television-broadcasting system have been preset leaving one channel indicator idle. Once preset in this manner it is only necessary to rotate knob 11 to align the scales of channel numerals corresponding to respective indicators 22 with the index 35 whereby the channel selector shaft 12 is rotated to select a particular preset channel. When, fine tuning is desired for the selected channel the knob 46 is operated again. The operation results in the conventional fine tuning. When selecting the desired channel it is not necessary to pay special caution so as to precisely align the index 35 with the numeral scale of the channel. Although it is possible to rotate knob 11 rapidly and continuously until the selected channel is reached as the element 18 is arrested by the detent 47 of the click stop segment 28, such selection can be felt by the hand of the operator. Then the operator stops rotation of the knob 11. Further, since the spacings between adjacent indicators are usually preset irregularly the operator can select the desired channel by his experience In this manner, it is possible to establish rapid tuning of only the selected preset channel by rotating knob 11, thus assuring efficient tuning operation. Shift in the preset tuning frequency can be readily restored by the fine tuning provided by the operation of knob 46. Above described preset operation can be readily made by the users in a given area and the user can also change the preset from one channel to the other.

Figure 4:
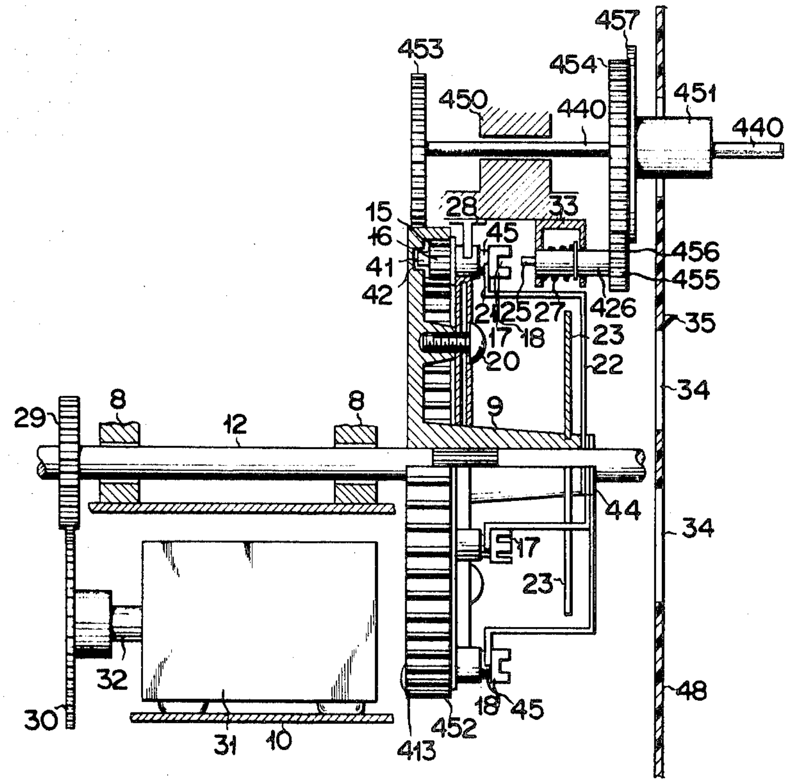
FIG. 4 shows a side elevation, partly in section, of a modified embodiment of this invention.

FIG. 4 illustrates another embodiment of this invention. Components shown in FIG. 4 corresponding to those shown in FIGS. 1 to 3 are designated by the same reference numerals while modified components are designated by reference numerals exceeding 400.

The modification shown in FIG. 4 is characterized in that the control shaft of a preset and fine-tuning shaft and a control shaft of a channel selector shaft are constructed coaxially. To this end, control shaft 440 for a channel selector shaft 12 is supported by a bearing 450 to be slidable in the axial direction in parallel with shaft 12. Control shaft 451 for a fine-tuning shaft 426 is arranged coaxial with shaft 440. Control shaft 451 is formed integral with shaft 440. Gear teeth 452 are formed around the periphery of rotor 413 to mesh with pinion 453 mounted on one end of shaft 440. Accordingly when control shaft 440 is rotated by turning a knob (not shown) secured to the outer end of shaft 440, the rotor 413 will be rotated. As shown, on the inner end of control shaft 451 is mounted a gear 454 to mesh a pinion 455 formed around rotor 456 secured to the outer end of preset and fine-tuning shaft 426. A stop plate 457 is secured to shaft 451 to engage the outer surface of pinion 455. A control knob (not shown) is secured to the periphery of shaft 451. In this example, knobs 11 and 46 employed in the example shown in FIG. 1 are not employed and the outer ends of shafts 12 and 426 are terminated on the inner side of front plate 48.

The channel selector shown in FIG. 4 is operated as follows. By the repulsive force of spring 27 shafts 440 and 451 are normally maintained in the condition shown in FIG. 4. As the control shaft 440 is rotated, rotor 413 is rotated to rotate the channel selector shaft 12 thus effecting channel selection. As the preset and fine-tuning element 18 and shaft 426 are separated, rotation of shaft 440 does not transmit a torque to element 18. To perform the preset and fine-tuning operation, control shaft 451 coupled with the preset and fine-tuning shaft 426 is pushed to the left as viewed in FIG. 4 while it is being rotated. Responsive to this movement gear 453 disengages teeth 452 of rotor 413 whereas element 18 and shaft 426 are coupled together thus rotating the former. As above described, rotation of element 18 performs the preset and fine-tuning operation. As both shafts 440 and 451 are moved in union they can be formed as a single shaft.

In the previous embodiments the channel selector shaft and the preset and fine-tuning shaft are disposed in parallel.

Figure 5:
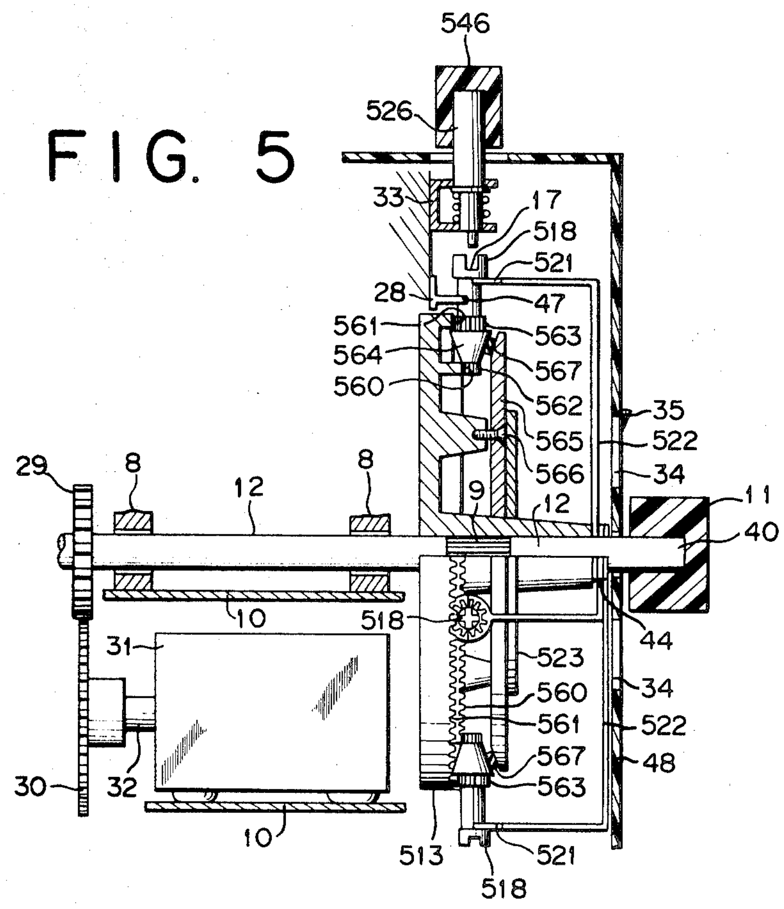
FIG. 5 shows a side elevation, partly in section, of another embodiment of this invention.

In the modification shown in FIG. 5 these two shafts are disposed at right angles, the channel selector shaft being operable from the front side whereas the preset and fine-tuning shaft from one side. Component parts shown in FIG. 5 and corresponding to those shown in FIGS. 1 to 3 are designated by the same reference numerals whereas modified component parts by the same reference numerals plus 500. New component parts are designated by numerals starting from 560.

As shown in FIG. 5 a preset and fine-tuning shaft 526 and its operating mechanism are disposed at right angles with respect to a channel selector shaft 12. To this end, the upper end of the front plate 48 is bent at right angles. The preset and fine-tuning element 518 to be coupled with shaft 526 is disposed in the lateral direction of the rotor 513 and two radially spaced apart annular gears 560 and 561 are formed on ridges of the rotor 513 about the axis of shaft 12. Pinions 562 and 563 respectively meshing these annular gears are mounted on element 518. A cone 564 is formed between pinions 562 and 563. The outer surface of the cone 564 is finished smoothly. A cylindrical portion of element 518 engages the detent 47 of the click stop segment 28 and the arcuate support 521 on the inner end of the indicator 522.

An element-clamping plate 565 is secured to one side of rotor 513 by means of bolts 566. The outer edge of the clamping plate 565 is slanted to hold an annular friction member 567. Thus the element 518 is supported by the friction member 567, click stop segment 28 and arcuate support 521 to rotate in the position shown in FIG. 5. A dial disc 523 marked with channel numerals is secured directly on the clamping plate 565.

The channel-selecting device illustrated in FIG. 5 is especially suitable for use in compact size television receivers of less than 16 inches. The channel-selecting shaft 12 is disposed to be operable from the front side of the receiver cabinet whereas the preset and fine-tuning shaft 526 is disposed to be operable from one side of the cabinet.

Channel selector can be made in the same manner as in the previous embodiments. More particularly, as shaft 526 is pressed inwardly while being rotated, element 518 is moved relative to rotor 513 to perform presetting. After being preset, a desired preset channel can be readily selected by the operation of channel selector shaft 12. Again, fine tunings of respective preset channels can be made by the aid of the fine-tuning shaft 526.

Figure 6:
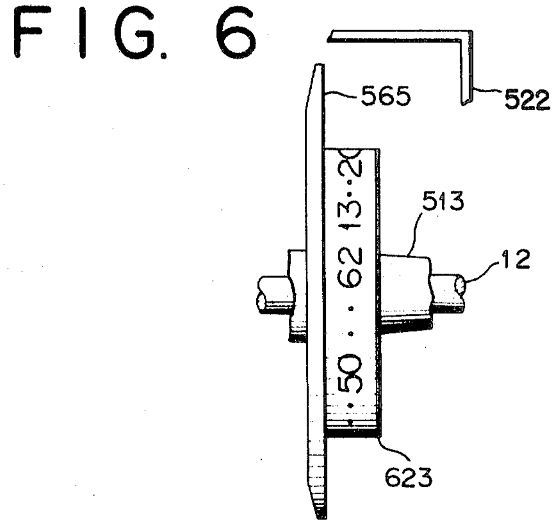
FIG. 6 is a side view of a modified dial employed in the embodiment shown in FIG. 5.

Although a disc shaped dial 523 has been shown it is convenient to modify the construction such that the user can view the dial from the same side as shaft 526. FIG. 6 illustrates such a modified embodiment. More particularly, an annular dial 623 is mounted on a clamping plate 565. Numerals are marked on the peripheral surface of the dial 623. The dial 623 is secured to shaft 12 to oppose indicators 22.

Figure 7:
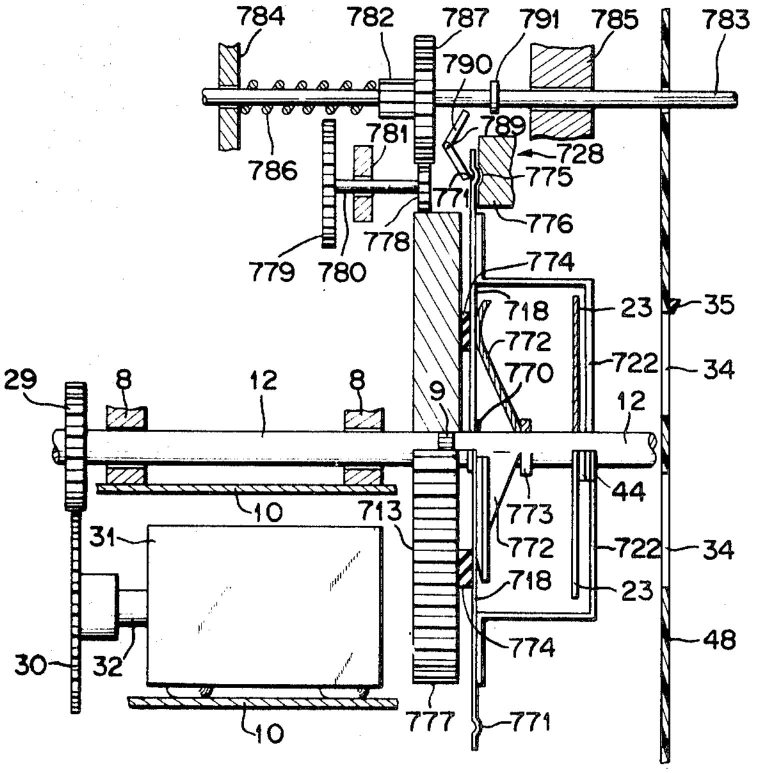
FIG. 7 shows a side elevation, partly in section, of a further modified embodiment of this invention.
Figure 8:
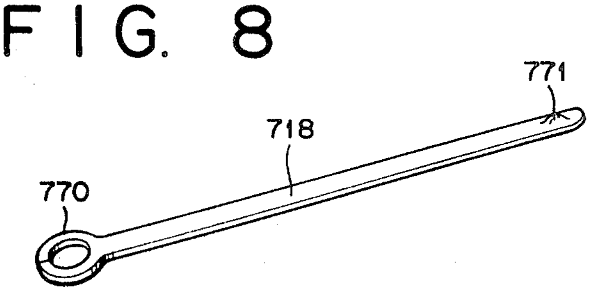
FIG. 8 is a perspective view of a preset and fine-tuning element employed in the modified embodiment shown in FIG. 7.

It will be clear that the invention is by no means limited to the particular construction shown in these embodiments. For example, instead of providing a pinion, the preset and fine-tuning element may be composed of an elongated metal strip. FIGS. 7 and 8 illustrate such a modified embodiment of this invention.

Component parts of the channel-selecting device shown in FIGS. 7 and 8 and corresponding to those shown in FIGS. 1 to 3 are designated by the same reference numerals, modified parts by the same reference numerals plus 700 while new component parts by reference numerals beginning with 770.

As shown in FIG. 8, the preset and fine-tuning element 718 employed in this embodiment is comprised by an elongated metal strip. A circular opening 770 is formed at one end of the element 718 to rotatably receive channel selector shaft 12 and a projection 771 is formed at the opposite end. Eight such elements 718 are mounted on the rotor 713, but for the sake of clearness, only two of them are shown in FIG. 7. These elements 718 are urged by a clamping plate 772 against the surface of rotor 713 under such pressure that the elements can slide on the surface of the rotor 713 about the axis of shaft 12. The clamping plate 772 has a substantially conical configuration and is secured to shaft 12 by a nut 773. A friction member 774 is secured to one side of the rotor 713 or to the rear side of the conical element 718. In this manner, as the element 718 is urged against rotor 713 through the friction member 774 by means of the clamping plate 772, all elements 718 are moved in union as the shaft 12 is rotated. However, as will be described later, elements 718 positioned at the preset and fine-tuning positions can slide relative to rotor 713. One end of each indicator 722 is rotatably fitted on the shaft while the opposite end is shaped to have substantially the same configuration as element 718 and is cemented thereto. Thus, similar to previous embodiments each indicator 722 is integrally bonded to a corresponding element 718. A stop mechanism 728 is provided for preset and fine-tuning position comprising a depression 775 in a stationary member 776 for engaging the projection 771. Thus, projections 771 of respective elements 718 moved with the rotor 713 are successively arrested by the stop mechanism 728. However, elements 718 can be readily disengaged from depressions 775 by manual operation. Gear teeth 777 are formed on the outer periphery of the rotor 713 to mesh a pinion 778 on one end of a shaft 780. A gear 779 is secured to the opposite end of shaft 780 and the intermediate portion of shaft 780 is journaled by a chassis frame 781. A control shaft 783 carrying a pinion 782 engageable with gear 779 is supported by a pair of spaced apart bearings 784 and 785 to be slidable in the axial direction. A spring 786 is interposed between pinion 782 and bearing 784 to normally urge shaft 783 to the right in the FIG. 7. Shaft 783 also carries a gear 787 meshing pinion 778. A rotatable detent lever 790 is pivotally secured to the stop mechanism 728 as at 789. When one end of lever 790 engages a shoulder 791 formed on the shaft 783 the opposite end is moved into depression 775. Although not shown in the drawing, both ends of the detent lever are biased to disengage from the shoulder 791 and depression 775 by means of a suitable spring.

The channel selecting device shown in FIG. 7 operates as follows. The control shaft 783 is operated in substantially the same manner as has been described in connection with FIG. 4. Thus, as the shaft 783 is rotated by a knob (not shown) mounted on shaft 784, rotor 713 is rotated over a relatively wide angle. Then one of the elements 718 which have been rotated with rotor 713 will be arrested at said position by the stop mechanism 728. Under these conditions, when control shaft 783 is moved to the left as viewed in FIG. 7 while being rotated gear 787 will be disengaged from pinion 778 while pinion 782 will be brought into engagement with gear 779. At the same time since the upper end of lever 790 comes to engage the rear surface of the shoulder 791 the lower end of the lever will force projection 771 into depression 775 to lock element 718 at that position. Under these conditions rotor 713 is rotated over a relatively narrow angle by a motion transmission mechanism comprising gears 782, 779 and 777. Consequently, element 718 slides relative to rotor 713 together with indicator 722 connected thereto so that when the element 718 is rotated to the particular channel numeral on the dial disc 23 which is desired to be preset, the desired preset is provided.

Other elements 718 can also be preset in the same manner. Further fine tuning is also possible. After preset, rotation of the control shaft under the condition shown in FIG. 7 provides the desired channel selection.

While in the foregoing description, elements 718 have been moved relative to the rotor 713, actually elements 718 are stationary and the rotor 713 is rotated relative thereto. The same is true for other embodiments.

Thus this invention provides a novel channel-selecting device capable of selecting any desired channel and of simply presetting the same. In addition, it is possible to readily provide accurate and fine tuning to each preset channel. Moreover since the construction of interlocking mechanism between the shaft 32 of the U.H.F. tuner 31 and the channel selector shaft 12 is very simple it is not only possible to provide stable channel selection and accurate fine tuning but also manifest high-tuning sensitivity.

Thus the novel channel selecting device is especially useful as U.H.F. tuners in television receivers as well as V.H.F. tuners. Of course it is also suitable as the tuner of radio receivers.

What I claim is:

1. A channel-selecting device comprising a chassis; a channel selector shaft mounted on said chassis to be rotatable continuously to various channel positions; a support mounted on said selector shaft to rotate therewith; a plurality of individually adjustable channel-selecting elements mounted on said support concentrically with said selector shaft; each one of said elements corresponding to each one of presettable channels; a supporting mechanism supporting said channel-selecting elements so as to permit said elements to rotate relative to said support and to arrest said elements in preset positions; a stop mechanism positioned at a predetermined position to successively engage said elements carried by said support; said stop mechanism arresting said elements with a force sufficient to be manually disengaged from said stop mechanism; indicators connected to said channel-selecting elements to move therewith; a channel dial to oppose said indicator, a mechanism to rotate said support while one of said channel-selecting elements is being arrested by said stop mechanism to preset said arrested elements to the desired channels, and a tuner having a shaft operatively connected to said channel selector shaft.

2. The channel-selecting device according to claim 1 wherein said tuner comprises a U.H.F. tuner of a television receiver.

3. A channel selecting and fine-tuning device comprising a chassis; a channel selector shaft mounted on said chassis to be rotatable continuously to various channel positions; a circular support concentrically mounted on said channel selector shaft to rotate therewith; said support being formed with gear teeth on the periphery thereof; a plurality of individually adjustable channel-selecting elements mounted on said support concentrically with said selector shaft; each one of said elements corresponding to each one of presettable channels and each of said elements being provided with a gear meshing said gear teeth of said support; a supporting mechanism mounted on said support to support said elements with said gear normally meshed with said teeth; a stop mechanism positioned at a predetermined preset and fine-tuning position to successively engage portions of said elements carried by said support; said stop mechanism arresting said elements with a force sufficient to be manually disengaged from said stop mechanism; indicators; one end of each indicator engaging one of said elements and the other end being rotatably supported by said selector shaft; a channel dial mounted on said support to oppose said indicators; a preset and fine-tuning shaft adapted to engage the outer end of said element arrested by said stop mechanism to cause said element to rotate; a spring normally urging said tuning shaft to disengage from said element and a U.H.F. tuner with an operating shaft coupled to said channel selector shaft through a motion transmission mechanism.

4. The channel selecting and fine-tuning device according to claim 3 wherein said channel selector shaft and said preset and fine-tuning shaft are parallel with each other.

5. The channel selecting and fine-tuning device according to claim 3 wherein gear teeth are formed on the outer periphery of said circular support and an independent channel-selecting control shaft is provided, said control shaft having a gear meshing said gear teeth.

6. The channel-selecting and fine-tuning device according to claim 3 wherein a pair of gear teeth are formed on the inner side of the outer periphery of said circular support, a pair of gear teeth are provided for said elements to mesh with said first mentioned gear teeth, and said preset and fine-tuning shaft adapted to rotate said elements is disposed at substantially right angles with respect to said channel selector shaft.

7. The channel-selecting and fine-tuning device according to claim 6 wherein said dial plate is formed on the outer periphery of said circular support.

8. A channel-selecting and fine-tuning device comprising a chassis; a channel selector shaft mounted on said chasses to be rotatable continuously to various channel positions; a circular support concentrically mounted on said selector shaft to rotate therewith; a plurality of individually adjustable channel selecting elements mounted on said support concentrically with said selector shaft; each one of said elements corresponding to each presettable channel; a supporting mechanism mounted on said shaft to support said elements on said circular support; a first stop mechanism positioned at a predetermined preset and fine tuning position to successively engage portions of said elements carried by said circular support; said stop mechanism engaging said elements with a force sufficient to be manually disengaged from said stop mechanism; indicators respectively mounted on said elements; a dial mounted on said channel selector shaft to oppose said indicators; a second stop mechanism to lock in position said element arrested by said first stop mechanism; a preset and fine-tuning mechanism to rotate said circular rotor with one of said elements held stationary by said second stop mechanism and a U.H.F. tuner having an operating shaft coupled with said channel selector shaft through a motion transmission mechanism.

9. The channel-selecting and fine-tuning device according to claim 8 wherein said second stop mechanism is arranged to engage said first stop mechanism.